United States Patent [19]

Liang et al.

[11] Patent Number: 5,462,908

[45] Date of Patent: Oct. 31, 1995

[54] ORGANIC AMINE IMPREGNATED ACTIVATED CARBON

[75] Inventors: Septimus H.-C. Liang; Brian H. Harrison, both of Nepean; Jack Pagotto, Kanata, all of Canada

[73] Assignee: Her Majesty the Queen in right of Canada, as represented by the Minister of National Defence, Ottawa, Canada

[21] Appl. No.: 77,110

[22] Filed: Jun. 16, 1993

[51] Int. Cl.[6] .............................. B01J 20/22; B01J 20/02
[52] U.S. Cl. ........................ 502/401; 502/416; 95/142
[58] Field of Search .................................. 502/401, 416; 95/142

[56] References Cited

U.S. PATENT DOCUMENTS

| | | | |
|---|---|---|---|
| 4,531,953 | 7/1985 | Groose et al. | 55/74 |
| 4,737,173 | 4/1988 | Kudirka et al. | 55/276 |
| 4,802,898 | 2/1989 | Tolles | 55/71 |
| 5,063,196 | 11/1991 | Doughty et al. | 502/417 |
| 5,145,820 | 9/1992 | Liang et al. | 502/401 |

Primary Examiner—Asok Pal
Assistant Examiner—Nhat D. Phan

[57] ABSTRACT

A novel organic amine-impregnated activated carbon composition is disclosed which may be used in breathing gas filters to enhance removal of various toxic perfluorocarbons. Three processes for impregnating activated carbon with organic amines are also disclosed. One of these processes comprises the steps of placing the amine in contact with substantially dry activated carbon, subjecting the carbon and amine to an environment devoid of oxidizing gases or vapors (such as oxygen gas), and then heating the carbon and amine for an extended period while maintaining this oxidizer-free environment. Pretreatment procedures to enhance both the shelf-life and service-life of the amine-impregnated activated carbon are also disclosed.

21 Claims, 3 Drawing Sheets

ORGANIC AMINE IMPREGNATED ACTIVATED CARBON

BACKGROUND OF THE INVENTION

This invention relates to activated carbon impregnated with an organic amine compound to improve the performance of the activated carbon against toxic perfluorocarbons, particularly trifluoronitrosomethane (TFNM), and to a process for impregnating activated carbon with organic amine compounds.

Activated carbon has been used in breathing gas filter canisters of gas masks for the removal of toxic gases both commercially and in military applications. For the removal of specific poisonous gases such as hydrogen cyanide (HCN) and cyanogen chloride (CNCl), activated carbons are used which typically contain certain metals (copper, chromium, and silver) usually in the form of an oxide crystallite. Typically, these adsorbents are known in the trade as ASC Whetlerite carbon or ASC/TEDA if the carbon also contains triethylenediamine, TEDA. The function of these metals or metal compounds is primarily to break down HCN or CNCl by chemical reaction(s) into innocuous gaseous products and/or products which are readily physisorbed or chemisorbed onto the activated carbon.

Trifluoronitrosomethane (TFNM), is a perfluorocarbon which is blue in colour and has a boiling point of −84° C. Under sunlight (UV irradiation), this gas dimerizes, and loses its intense blue hue to become faintly yellow. TFNM is sufficiently toxic to be a high hazard, even to subjects protected by standard carbon adsorbent filters. The amine-impregnated activated carbon invention described herein was found to be particularly effective in chemisorption of this type of compound and is the first carbon adsorbent capable of removing this toxic gas from the breathing air stream.

DESCRIPTION OF THE PRIOR ART

From a methodology viewpoint, there are several ways to apply an organic amine to the surface of activated carbon. One proposal for applying TEDA to the surface of activated carbon is found in U.S. Pat. No. 4,531,953, which was issued to J. E. Groose et al on Jul. 30, 1985. The Groose patent proposes the direct sublimation of TEDA onto the activated carbon surface at atmospheric pressure. Such a process eliminates the subsequent drying procedure because no solvent is involved. Another method for applying TEDA onto the surface of activated carbon under reduced pressure has been detailed in U.S. Pat. No. 5,145,820, which was issued to S. H. Liang et al on Sep. 8, 1992.

SUMMARY OF THE INVENTION

Accordingly, it is an objective of the present invention to provide an organic amine impregnated activated carbon and a method for the preparation thereof in which toxic perfluorocarbons, particularly TFNM, can be effectively removed from the breathing air stream.

According to one aspect of the invention, a breathing gas filter composition capable of removing toxic agents, such as perfluorocarbons, e.g. TFNM, is provided. This composition comprises activated carbon and an organic amine impregnant, selected from the group consisting of amines, substituted amines, amides and sulfonamides, such as aliphatic secondary and tertiary mono-amines, aliphatic secondary and tertiary mono-amides and aliphatic secondary and tertiary sulfonamides, in an amount of 1.5 to 18% w/w.

According to another aspect of the invention, a process for impregnating activated carbon with a low vapour pressure organic amine is provided, comprising the steps of placing the amine in contact with substantially dry activated carbon, subjecting the activated carbon and amine to an oxidizer-free environment, and then heating the carbon and amine for an extended period while maintaining the oxidizer-free environment.

The amine-impregnated carbon is preferably stored until use, in an oxidizer-free enclosure.

In some cases, the amines have a tendency to break down (dissociate) due to the presence of acidic surface sites. Accordingly, the activated carbon is preferably pretreated to prevent the degradation of the amine compounds on the carbon surface. The pre-treatment procedure includes neutralization to a substantially neutral pH (by an alkaline solution such as KOH or NaOH), or alkalinization to a basic pH in the same manner, or reaction of the acid sites (typically these are oxygen-containing moities) by halogenation (such as by $Cl_2$ and $Br_2$). These treatments effectively de-activate the surface acidic groups on the carbon, thus enhancing the stability of the adsorbed amines on the carbon surface. A U.S. Pat. No. 4,072,479 issued to Sinha et al on Feb. 7, 1978 has detailed the use of NaOH in the treatment of activated carbon for the removal of malodorous compounds, particularly sulfur-containing compounds from air stream. However, in the present disclosure, the treatment with NaOH is not paramount nor necessary in the protection against perfluorocarbons. Our pretreatment of carbon with NaOH or KOH is used solely to enhance the shelf and service life of the amine-impregnated carbon, particularly in the presence of humid air.

More specifically, the adsorption of amines on activated carbon is largely physical in nature, taking place through undissociated molecules. However, some of the amine molecules will form hydrogen bonds with the acidic oxygen-containing moities (e.g. —$CO_2$ complex) on the carbon surface. The acidic groups on which the amine is dissociated on the carbon surface are readily eliminated or de-activated by the treatment with halogens or alkaline solutions (such as KOH and NaOH). Excess alkalinity on the carbon surface (in the form of OH groups) will tend to stabilize the amine on the surface and prevent it from dissociating (i.e. push the equilibrium towards the undissociated molecule). A similar benefit is achieved through pretreatment of the carbon surface by halogenation. The halogen reacts with the acidic oxygen-containing moities on the carbon surface, thereby 'de-activating' them so that the subsequent physisorption of the active amine impregnant is not accompanied by reactions with surface acidic sites which would deplete the amount of amine available in the desired form. As with the alkaline pretreatment, halogenation serves a dual purpose since the resulting halide salts e.g. hydrogen halide salts, on the surface will also stabilize the amine molecules on the carbon surface by reducing the amount of dissociation. Thus alkaline or halogen pretreatments of the carbon surface remove the undesirable effect that would result from reaction with surface acidic oxides and at the same time provides a means for stabilizing the active amine impregnant in the undissociated form. Experiments have shown that this step will extend the shelf and service life of the carbon.

The mechanism involved in providing the oxidizer-free environment involves displacing and/or removing oxidizing gases such as oxygen from the bulk void space within the carbon and process chamber.

The oxidizer-free environment can be achieved, for example, in two ways: first, by continuously purging the process chamber (containing the amine and carbon) during the impregnation step, with an oxygen-free inert gas (such as nitrogen, helium, argon etc.) at a pressure slightly higher than atmospheric (1–5 Pa); or secondly, by applying a reduced pressure (typically 0.1 to 100 Pa) to the process chamber, thus removing all oxidizing gases or vapours.

To ensure adequate homogeneity, the heating/equilibration step may be conducted at slightly elevated temperatures, typically in the range of 40° to 60° C., for a period of 1 to 72 hours, depending upon the amine impregnant.

The use of the method according to the invention facilitates the vaporization of the amine, the penetration of the amine molecules into the micropores on the activated carbon surface, and subsequently the adsorption of the amine molecules onto the activated carbon surface. Furthermore, the oxidizer-free environment will impede the oxidation of the amine impregnants on the carbon surface as discussed by Hershman et al, in U.S. Pat. No. 4,264,776 issued on Apr. 28, 1981. The lengthy heating step, preferably conducted with continuous mixing in a closed container, allows a "surface distillation" of the amine (by adsorption-desorption processes), thus promoting an even distribution of amine molecules on the activated carbon surface. Accordingly, the three basic steps of the method surface. Accordingly, the three basic steps of the method include initial drying and degassing; impregnation of activated carbon with the amine in an oxidizer-free environment and equilibration at an elevated temperature.

The initial drying step was deemed necessary after testing the present impregnation method using two types of activated carbon. The first type was freshly prepared impregnated ASC Whetlerite activated carbon. Since ASC activated carbon must be dried after whetlerization, the drying procedure can be incorporated into the last step of the impregnation procedure. The other type of activated carbon was aged activated carbon at various levels of moisture content. For impregnation of amine in the presence of moisture/humid air, the amine molecules have to displace adsorbed water from the activated carbon in order to penetrate into the large surface area available in the meso and micropores. If the micropores on the activated carbon surface are completely or partially filled with water, the adsorption of amine will be limited by how quickly adsorbed water can be displaced which is a kinetic problem. It is also possible that reactions may occur with some of the amines disclosed, if water is present. Therefore, the activated carbon should be dry before the introduction of the amine.

The second step in the method, namely impregnation of the activated carbon by the amine, includes the following series of processes:
(i) Sublimation or vaporization of amine;
(ii) external diffusion of amine molecules to the activated carbon surface;
(iii) internal diffusion of amine molecules inside the activated carbon pores; and
(iv) adsorption of amine molecules.

After impregnating the activated carbon with amine, an equilibration period is provided to allow the amine adsorption process to reach equilibrium. Performing the process at a slightly elevated temperatures of 40° C. to 60° C. permits repeated desorption and redeposition of the amine to occur. Thus, a more uniform distribution of amine molecules on the activated carbon surface is achieved. At reduced pressure, the sublimation or vaporization of the amine is expedited, and thus facilitates the desorption and re-adsorption of amine on the activated carbon surface. In an oxidizer-free inert gas environment, the competition for adsorption sites on the carbon surface between the amine and inert gas will be minimal, because inert gas does not adsorb on carbon surface to any appreciable extent. This environment will also enhance the adsorption of amine molecules onto the carbon surface. Furthermore, avoidance of an oxidizing environment inhibits reactions such as the decomposition of tertiary amines in the presence of oxygen and carbon.

DESCRIPTION OF PREFERRED EMBODIMENTS OF THE INVENTION

Experimental-Chemicals

Figure 1:
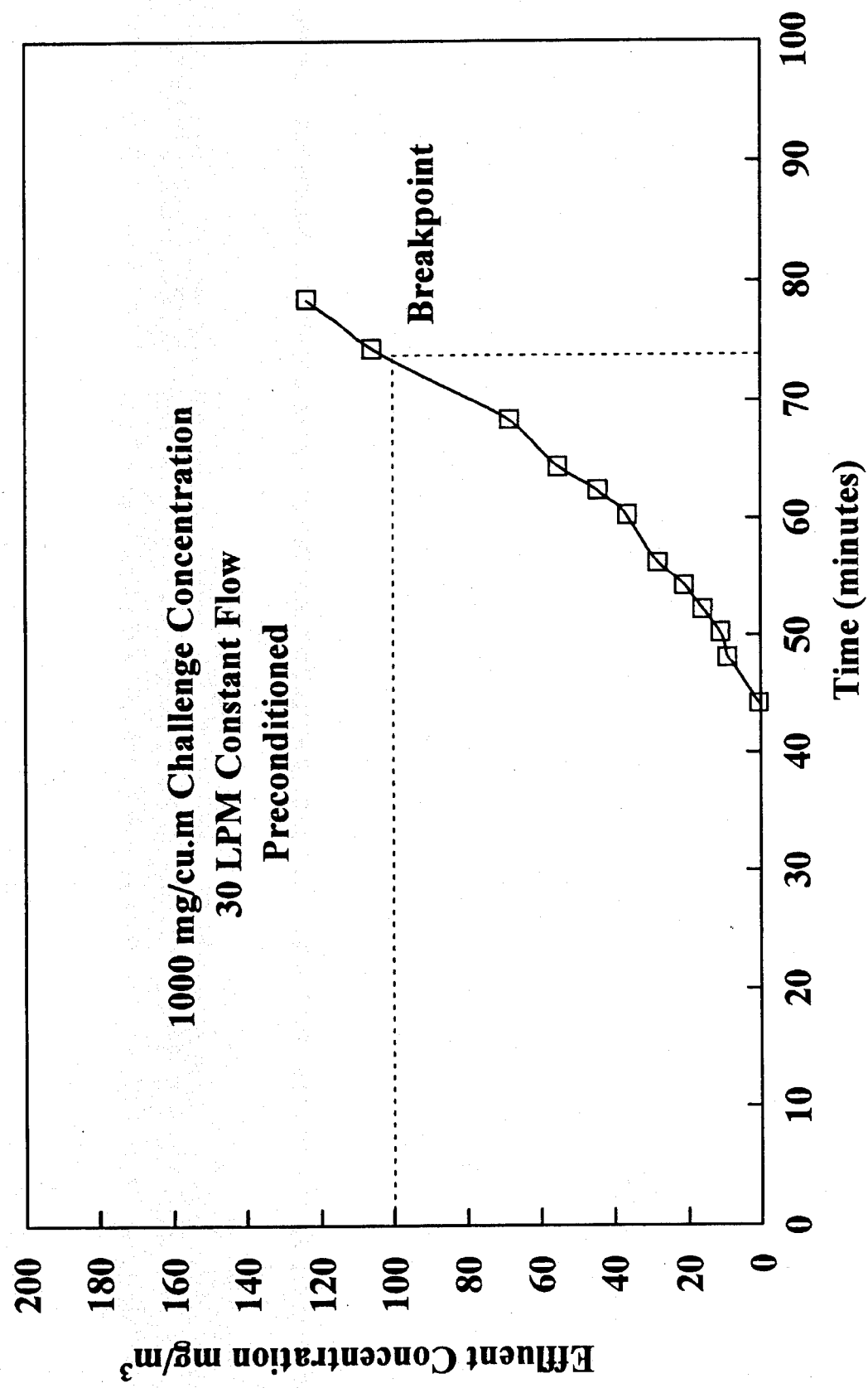
FIG. 1 is a graph of the breakthrough profile of TFNM on several fresh (i.e. dry) amine-impregnated activated carbons.

All amines were purchased from commercial sources and were used without further purification. A wide range of activated carbons have been shown to be suitable for impregnation. Examples given here are ASC whetlerites (i.e. carbons previously impregnated with copper, chromium and silver), ASC/T (ASC Whetlerite, including 2% triethylenediamine), or a BPL (base carbon with no chemical impregnants).

Pre-treatment of Carbon

Halogenation

This reaction can be carried out in either gaseous or aqueous phase. Typically, carbon is stirred in an aqueous $Br_2$ or $Cl_2$ solution for several hours (typically 4 to 16 hours). The solution is then removed by suction filtration and the carbon washed with copious amounts of water. The carbon is then dried at 105° to 150° C. at reduced pressure (typically <100 Pa). Subsequent to this step, the carbon can be further activated at between 200° to 400° C. for up to 4 hours under reduced pressure (typically <100 Pa).

Neutralization

A solution containing activated carbon is neutralized to an alkaline pH with an alkaline solution containing an alkaline hydroxide, such as NaOH or KOH. The carbon, including 0.1 to 10% w/w of the alkaline hydroxide, is then washed until a substantially neutral pH is obtained, dried and activated as in the halogenation procedure.

Alkalinization

Sufficient solution containing 0.1 to 12% (w/w) of the alkaline hydroxide (NaOH or KOH) is added to the activated carbon so that it is visibly saturated. The slurry is then stirred for a minimum of 30 minutes. Heat can be applied to accelerate the process. The solution is then removed by suction filtration, and the carbon dried at 105° to 150° C. under reduced pressure (typically <100 Pa). Further activation at 200° to 400° C. for up to 4 hours may be beneficial for some carbons.

Impregnation of Amines

Three methods were employed in the impregnation of amine compounds on ASC carbons. The first method (described above) utilizes the inherent (although quite low) vapour pressure of the amines (solid or liquid) to drive the adsorption process. This method works extremely well with all liquid amines and some solid amines e.g. triethylenediamine and hexamethylene-tetramine.

A second method was designed for solid amides such as ortho- and para-toluenesulfonamide which do not have sufficient vapour pressure for the first method to work. A 250 mL solution containing the desired loading levels (usually 1.5 to 18% by weight) of amide dissolved in 95% ethanol is first obtained. The solution is then added to 250 g ASC charcoal. When the addition of the impregnated solution is completed, the ethanol is removed under reduced pressure from the "wet" carbon. This typically lasts ½ to ¾ hour. By then, the carbon is sufficiently dry and quite free-flowing. The carbon is then spread out uniformly (ca. 0.5 cm high) on two watch glasses and placed inside a vacuum oven. The carbon is dried at less than 100 Pa, 50°–60° C. for up to 16 hours. Mass balance calculations show that essentially all the ethanol is removed following this treatment, and that all the amide impregnants remain behind, inside the pore structure of the carbon.

A third method utilizes the solubility in water of the desired impregnants such as urea. The preparation of the solution is very similar to that proposed by Joshua C. Whetzell and E. W. Fuller, who gave rise to the term 'Whetlerite'. An ammoniacal solution containing about 7% copper, 2% chromium and the desired amide impregnant is prepared. BPL carbon is typically used as a base material in the preparation of these amide-impregnated carbons. The first step of a preparation consists of making an ammonia solution by adding 250 mL of $NH_4OH$ to 400 mL of deionized distilled water. Then 37 grams of $CrO_3$, followed by 164 grams of ammonium carbonate, 31 grams of urea and 117 grams of $CuCO_3.Cu(OH)_2$ is added (in the above order) and dissolved in the solution. This solution is then added onto 440 grams of carbon dropwise until a liquid excess is plainly visible. The ratio of impregnating solution to carbon is approximately 1.4 mL/g. The "wet" impregnated carbon is then removed, drained with occasional shaking for 30 to 40 minutes. The carbon is then spread to an even thickness on a flat container and dried in a forced-draft oven gradually over a period of 220 minutes as follows: 80° C. (40 minutes) 100° C. (30 minutes), and finally at 120° C. (150 minutes). The resulting impregnated carbon typically will have the following composition (w/w): 3% Cr, 10% Cu, 3% urea, and certain amounts of $CO_2$ and $NH_3$. The development of this impregnating procedure was an attempt to make the process more cost effective since all the impregnants can be added onto the carbon in one step. However, one drawback of this process is that the drying step in the impregnation has to be carried out at lower temperatures (about 120°–150° C.) to avoid self-ignition of the carbon. This may result in carbon which has moisture content higher than 2%.

Evaluation of the Amine-Impregnated Carbons

The amine-impregnated carbons prepared above were evaluated on its protection against toxic perfluorocarbons, such as trifluoronitrosomethane. The impregnated carbons were loaded inside a container with an inside diameter of 10.5 cm, and to a bed height of 1.25 or 2 cm. A continuous flow of the test perfluorocarbon gas at 1000 mg/m$^3$ diluted inside an air stream at a flow rate of 30 L/min, 30° C. and 80% RH was introduced into the carbon bed, and the effluent from the carbon bed was monitored for this perfluorocarbon gas, by a calibrated gas chromatography instrument. The breakthrough time is set at the time when the effluent perfluorocarbon gas concentration reaches 100 mg/m$^3$, 1/10 of the original influent concentration.

Some selected amine-impregnated carbons were also tested and proven effective against other perfluoro-carbons such as perfluoroisobutene and hexafluoro-cyclobutene.

First Screening of Amine Impregnants

In order to evaluate all candidate amine impregnants systematically, the amine compounds used in this work were categorized into three major groups: aliphatic, aromatic and heterocyclic, which were then further divided into 3 classes: primary, secondary and tertiary, as shown in Table 1 below. In addition, an extra group under "Functional Substituents" was added to indicate amine compounds which contain additional substituents, such as a nitro group (as in 4-(4-nitrobenzyl)pyridine). Thus a simple 3×4 experiment matrix was set up so that any trend or anomaly could be correlated between the activity (protection against trifluoronitrosomethane) and the position in the matrix.

The amine impregnated carbons were evaluated as follows: beds of 125 or 170 mL impregnated carbon were loaded into a 10.5 cm diameter container, and tested against trifluoronitrosomethane at 1000 mg/m$^3$ at an airflow of 30 L/min at 25° C. and 80% RH. The breakthrough time results are collected in Table 2 below. The effluent from the canister was monitored for TFNM until a concentration of 100 mg/m$^3$ was reached, and the time to reach this concentration from time zero was arbirtrarily designated as the 'breakthrough time'. A typical challenge profile of TFNM through several of these amine-impregnated carbons is shown in FIG. 1. Specifically, TFNM at 1000 mg/m$^3$ on an activated carbon (125 mL, 10.5 cm diameter bed) impregnated with 7% (by weight) of triethylamine, that had been preconditioned at 80% RH until constant weight was achieved.

TABLE 1

Matrix of All Candidate Amines

| | Aliphatic | Aromatic | Heterocyclic | Functional Substituents |
|---|---|---|---|---|
| Primary | Diethylenetriamine $H_2N(CH_2)_2NH(CH_3)_2NH_2$ | Aniline ($C_6H_5NH_2$) | | Monoethanolamine ($HO-CH_2-CH_2-NH_3$) |
| | Ethylenediamine $H_2N(CH_2)_3NH_2$ | 4-phenylazoaniline ($C_6H_5-N=N-C_6H_4-NH_2$) | | Urea $O=C(NH_2)_2$ |
| | Isopropylamine i-$C_3H_5NH_2$ | N,N-diethyl-1,4-phenylenediamine ($(C_2H_5)_2N-C_6H_4-NH_2$) | | p-Toluenesulfonamide ($CH_3-C_6H_4-SO_2NH_2$) |
| | | | | o-Toluenesulfonamide |
| Secondary | Diisopropylamine (i-$C_3H_5)_2NH$ | Diphenylamine ($(C_6H_5)_2NH$) | Piperidine | |
| | Dipropylamine | Pyrrole | | |
| | Diethylenetriamine | | | |
| Tertiary | $H_2N(CH_2)_3NH(CH_2)_3NH_2$ Triethylamine | N,N-diethylaniline | Pyridine | 4-(4-Nitro- |

TABLE 1-continued
Matrix of All Candidate Amines
| Aliphatic | Aromatic | Heterocyclic | Functional Substituents |
|---|---|---|---|
| $(C_2H_5)_3N$ | N,N-diethyl-1,4-phenylenediamine 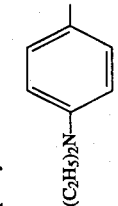 | 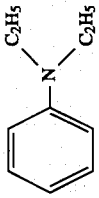 | benzyl)pyridine 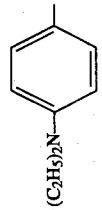 |
| Triisobutylamine | 4-phenylazoaniline 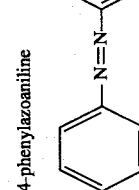 | 4-(4-Nitrobenzyl)pyridine 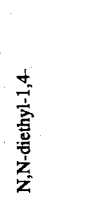 | |
| Trioctylamine | | Hexanethyleneamine 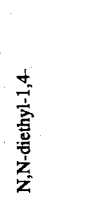 | |
| | | TEDA 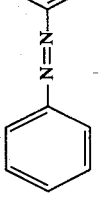 | |

It is noted that in Table 2 below, some secondary amines, such as diisopropylamine, pyrrole, and piperidine, and some tertiary amines such as triethylamine seemed to provide the best protection against TFNM. Impregnated carbons from these amines all produced longer breakthrough times than other amine impregnated carbons. Furthermore, it has been found from stoichiometry that 2 moles of TFNM were consumed per mole of secondary and tertiary amines. Thus it is expected that aliphatic secondary and tertiary amines to perform better against trifluoronitrosomethane than the rest of the candidate amines. Diamines did not appear to offer better protection against TFNM than other amines.

TABLE 2

First Screening of Selected Amine Impregnants as Carbon Carbon Impregnants for Enhanced Protection Against Perfluorocarbons*

| Amine | % Loading (w/w) | Breakthrough Time (minutes) |
|---|---|---|
| Primary/Aliphatic | | |
| Diethylenetriamine | 6.0 | 29.5 |
| Ethylenediamine | 5.7 | 54.0 |
| Isopropylamine | 4.0 | 51.5 |
| Primary/Aromatic | | |
| Aniline | 3.0 | 51.5 |
| Aniline | 6.0 | 52.5 |
| Aniline | 7.5 | 58.5 |
| N,N-diethyl-1,4-phenylenediamine | 3.3 | 36.0 |
| 4-phenylazoaniline | 3.4 | 18.0 |
| Secondary/Aliphatic | | |
| Diisopropylamine | 12.4 | 65.0 |
| Diethylamine | 7.1 | 45.3 |
| Diethylenetriamine | 6.0 | 29.5 |
| Secondary/Aromatic | | |
| Diphenylamine | 5.5 | 6.3 |
| Pyrrole | 5.7 | 69.5 |
| Secondary/Heterocyclic | | |
| Piperidine | 3.6 | 65.0 |
| Piperidine | 5.5 | 71.0 |
| Tertiary/Aliphatic | | |
| Triethylamine | 5.0 | 67.0 |
| Tertiary/Aromatic | | |
| N,N-diethylaniline | 3.0 | 38.3 |
| N,N-Diethyl-1,4-phenylenediamine | 3.3 | 36.0 |
| 4-phenylazoaniline | 3.4 | 18.0 |
| Tertiary/Heterocylclic | | |
| Pyridine | 3.6 | 26.5 |
| Pyridine | 5.7 | 27.2 |
| 4-(4-Nitrobenzyl)-pyridine | 5.8 | 34.5 |
| Hexamethyleneamine | 6.5 | 42.8 |
| Triethylenediamine | 1.5 | 26.7 |
| Functional Substituents | | |
| Monoethanolamine | 2.7 | 47.7 |
| 4-(4-Nitrobenzyl)-pyridine[6] | 5.8 | 34.5 |
| Urea | 3.1 | 54.0 |
| Urea | 2.0 | 56.5 |
| N,N-dimethylformamide | 7.0 | 43.5 |
| O-toluenesulfonamide | 5.0 | 68.5 |
| P-toluenesulfonamide | 5.0 | 39.7 |

*Note:

TABLE 2-continued

First Screening of Selected Amine Impregnants as Carbon Carbon Impregnants for Enhanced Protection Against Perfluorocarbons*

| Amine | % Loading (w/w) | Breakthrough Time (minutes) |
|---|---|---|

All tests were carried out using 170 mL of the amine-impregnated carbon contained inside a filter canister body. All carbons were conditioned at 30° C. and 80% RH until equilibrium weight of water was obtained before testing. Each challenge test consisted of a continuous flow of 1000 mg/m$^3$ of $CF_2NO$ in an air flow of 30 L/min at 890% RH and 30° C. The breakthrough time is determined as the time it takes the effluent test gas to reach 100 mg/m$^3$.

Secondary Screening of Candidate Amines as Carbon Impregnants

In this section, the "better amine impregnants" were loaded onto the carbon at different loading levels and tested against trifluoronitrosomethane as shown in Table 3 below. The purpose is to identify the optimum loading level of the amines on the carbon.

In general, it appeared the higher the loading level of amines, the better the protection against TFNM. All the candidate amines shown in Table 3 showed very good performance. Furthermore, it seemed that dipropylamine, piperidine and triethylamine yielded the longest breakthrough times against TFNM at a loading level of 7% and pyrrole was even better at a loading level of 5%. Diisopropylamine seemed to be the best candidate amine because there was no penetration of TFNM at all loading levels. In all cases, the level of protection against TFNM improves, as the percentage loading level of amine increases.

TABLE 3

Second Screening: Protection Afforded by Selected Amine-Impregnated Dry Carbons Against TFNM

| Amine | % Loading | Density (g/mL) | Breakthrough Time (minutes) |
|---|---|---|---|
| Dipropylamine | 4.0 | 0.62 | 71.5 |
|  | 5.5 | 0.63 | 75.0 |
|  | 7.2 | 0.65 | 85.0 |
|  | 7.3 | 0.66 | 87.0 |
|  | 12.0 | 0.68 | 83.0 |
| Diisopropylamine | 3.2 | 0.61 | 75.3 |
|  | 5.1 | 0.62 | 79.1 |
|  | 7.0 | 0.64 | 81.0 |
|  | 9.9 | 0.67 | 78.4 |
| Pyrrole | 5.2 | 0.63 | 69.4 |
|  | 6.8 | 0.64 | 74.0 |
| Piperidine | 3.3 | 0.61 | 65.0 |
|  | 5.0 | 0.62 | 69.0 |
|  | 6.9 | 0.64 | 72.0 |
|  | 9.7 | 0.66 | 76.0 |
| Triethylamine | 3.5 | 0.61 | 39.7 |
|  | 5.0 | 0.62 | 71.0 |
|  | 6.8 | 0.63 | 75.0 |
|  | 7.1 | 0.63 | 78.2 |
|  | 8.1 | 0.64 | 81.5 |
|  | 9.1 | 0.64 | 89.0 |
|  | 15.0 | 0.70 | 87.2 |
| Triisobutylamine | 7.1 | 0.66 | 68.5 |
| Tricotylamine | 4.9 | 0.63 | 51.5 |
|  | 7.2 | 0.65 | 47.7 |

Note: See footnote for Table 2 for test conditions.

Third Screening of the Amine-Impregnated Carbons

Further testings were performed on other toxic perfluorocarbons such as perfluoroisobutene (PFIB) and hexafluorocyclobutene (HFCB) using triethylamine-impregnated carbon at 7% (w/w) loading level.

Figure 2:
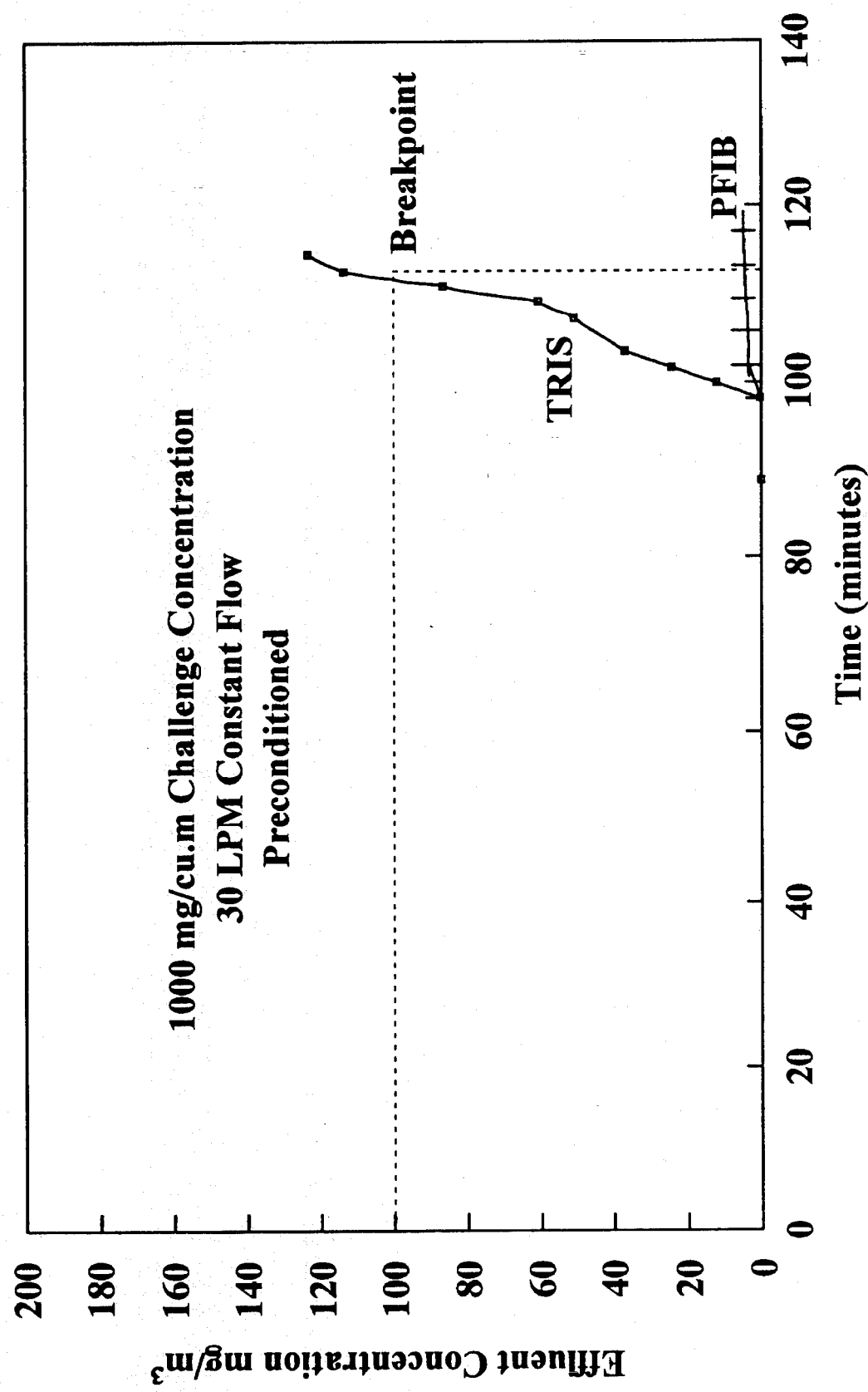
FIG. 2 is a graph of the breakthrough profile of perfluoroisobutene at 1000 mg/m$^3$ on an activated carbon impregnated with triethylamine.
Figure 3:
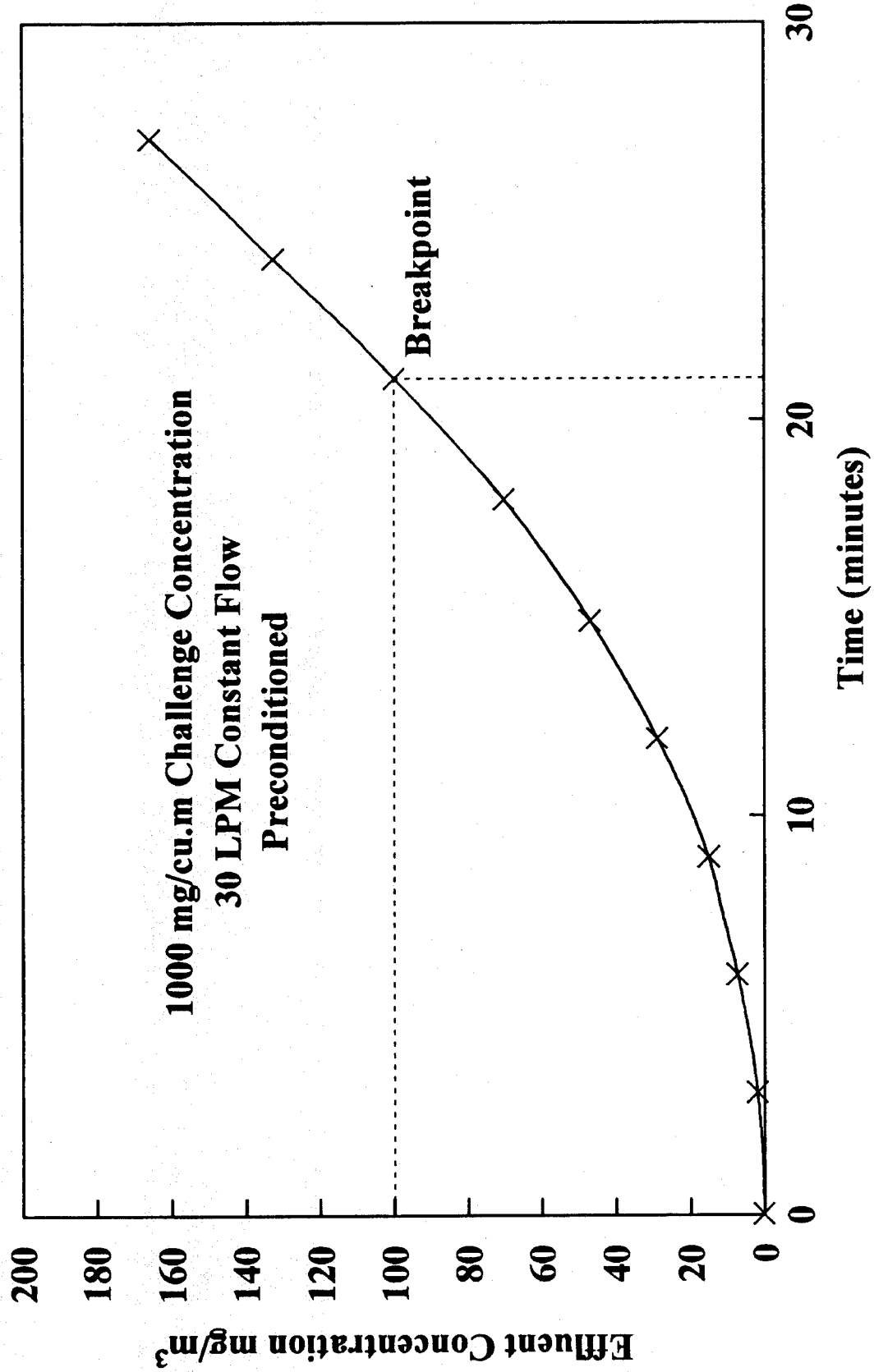
FIG. 3 is a graph of the breakthrough profile of hexafluorocyclobutene at 1000 mg/m$^3$ on an activated carbon impregnated with triethylamine.

As seen in FIGS. 2 and 3, the results were extremely promising. At a continuous challenge of 1000 mg/m³ of PFIB, the breakthrough time is 155 minutes (i.e. it takes 155 minutes for the PFIB effluent from the canister to reach 100 mg/m³). The breakthrough time for tris(trifluoromethyl)methane (TRIS), a non-toxic breakdown product from the reaction between the activated carbon and PFIB is 163.2 minutes. For HFCB, the breakthrough time is 28.8 minutes under similar conditions. More specifically, in both FIGS. 2 and 3, an activated carbon (125 mL, 10.5 cm diameter bed) impregnated with 7% (by weight) of triethylamine, that had been preconditioned at 80% RH until constant weight was achieved, is involved; (note that in FIG. 2, perfluoroisobutene (labelled PFIB) converts to form tris(trifluoromethyl)methane (labelled TRIS).

To investigate the universality of this amine impregnation process, other activated carbons, namely the BPL (carbon with no previous impregnation history) and ASC/TEDA carbon were studied. The acceptance of amine impregnants on these carbons, and the protection against trifluoronitrosomethane and other perfluorocarbons were evaluated. The methods for loading the amine impregnants on these carbons are similar to those described above for the ASC whetlerite. The results are summarized in Table 4. As shown, the choice of base carbons make very little effect on the performance of the impregnated carbon against TFNM.

TABLE 4

Protection Against Trifluoronitrosomethane by Using Different Base Carbons

| Base Carbon | Impregnants | Breakthrough Time (minutes) |
|---|---|---|
| BPL | Dipropylamine | 72.8 |
| | Triethylamine | 73.0 |
| | Piperidine | 72.0 |
| ASC/T | Dipropylamine | 79.0 |
| | Triethylamine | 82.0 |
| | Piperidine | 72.8 |

Notes:
(1) All amine impregnants were loaded at 5% by weight.
(2) All challenge tests were conducted using the same conditions as in Table 2.
Similar experiments using ASC/TEDA carbons (i.e. without the amine impregnants mentioned in this disclosure) result in breakthrough times much lower than those shown in FIGS. 1 to 3, depending on the perfluorocarbon.

We claim:

1. A breathing gas filter composition providing protection against toxic perfluorocarbons, comprising substantially dry activated carbon and an organic amine impregnant, said organic amine being selected from the group consisting of substituted amines, amides and sulfonamides in an amount of 1.5 to 18% by weight, based on the weight of the carbon and additionally comprising 0.1 to 10% by weight, based on the weight of the carbon of an alkaline hydroxide.

2. A composition according to claim 1, wherein the organic amine is selected from the group consisting of aliphatic secondary and tertiary amines.

3. A process for impregnating activated carbon with a low vapour pressure organic amine, comprising the steps of placing the amine in contact with substantially dry activated carbon, subjecting the carbon and amine to positive pressure of 1–5 Pa in an oxygen-free inert gas atmosphere and then heating the carbon and amine for an extended period while maintaining the positive pressure of 1–5 Pa in an oxygen-free inert gas atmosphere, including the step of pre-treating the activated carbon with a compound selected from the group consisting of an alkaline hydroxide in an amount of 0.1 to 10% by weight, based on the weight of the carbon, a suitable halogen and a suitable halide salt.

4. A process according to claim 3, including the additional step of storing the amine-impregnated carbon in an oxidizer-free enclosure.

5. A process according to claim 3, wherein the heating step is effected at 40° to 60° C. for 1 to 72 hours.

6. A process according to claim 4, wherein the oxygen-free inert gas is selected from the group consisting of nitrogen, argon and helium.

7. A process according to claim 3, wherein the organic amine is included in an amount of 1.5 to 18% by weight, based on the weight of the carbon.

8. A process according to claim 7, wherein the amine is selected from the group consisting of aliphatic secondary and tertiary amines.

9. A process according to claim 8, wherein the amine is included in an amount of 4 to 7% by weight, based on the weight of the carbon.

10. A process according to claim 9, wherein the activated carbon is selected from the group consisting of carbon impregnated with copper, silver and chromium, unimpregnated base carbon, and carbon impregnated with copper, silver, chromium and triethylenediamine.

11. A process according to claim 10, wherein the activated carbon is carbon impregnated with copper, silver and chromium.

12. A process according to claim 11, wherein the amine is selected from dipropylamine and triethylamine.

13. A process according to claim 3, wherein the compound is selected from the group consisting of a suitable halogen and a suitable halide salt.

14. A process for impregnating activated carbon with a solid amine compound, comprising dissolving the amine in a solvent selected from water and organic solvents and adding the amine solution to the activated carbon, including the step of pre-treating the activated carbon with a compound selected from the group consisting of an alkaline hydroxide in an amount of 0.1 to 10% by weight, based on the weight of the carbon, a suitable halogen and a suitable halide salt.

15. A breathing gas filter composition providing protection against toxic perfluorocarbons, comprising substantially dry activated carbon and an organic amine impregnant, said organic amine being selected from the group consisting of ethylenediamine, dipropylamine, isopropylamine, aniline, N,N-diethyl-1,4-phenylenediamine, 4-phenylazoaniline, diisopropylamine, diethylamine, diethylenetriamine, diphenylamine, pyrrole, piperidine, triethylamine, triisobutylamine, tricotylamine, N,N-diethylaniline, 4-(4-nitrobenzyl)-pyridine, hexamethyleneamine, monoethanolamine, urea, N,N-dimethylformamide, o-toluenesulfonamide and p-toluenesulfonamide, in an amount of 1.5 to 18 percent by weight, based on the weight of the carbon and additionally comprising 0.1 to 10% by weight, based on the weight of the carbon of an alkaline hydroxide.

16. A composition according to claim 15, additionally comprising 0.1 to 10% by weight, based on the weight of the carbon of an alkaline hydroxide.

17. A composition according to claim 15, wherein the amine is selected from the group consisting of dipropylamine, diisopropylamine, pyrrole, piperidine, triethylamine, triisobutylamine and tricotylamine.

18. A composition according to claim 17, wherein the organic amine is included in an amount of 4 to 7% by weight, based on the weight of the carbon.

19. A composition according to claim 17, wherein the amine is triethylamine.

20. A composition according to claim 17, which the amine is dipropylamine.

21. A composition according to claim 17, claim the amine is piperidine.

* * * * *